US012597122B2

(12) United States Patent
Hwang et al.

(10) Patent No.: US 12,597,122 B2
(45) Date of Patent: Apr. 7, 2026

(54) DEFECT DETECTION DEVICE AND METHOD THEREOF

(71) Applicant: SAMSUNG ELECTRONICS CO., LTD., Suwon-si (KR)

(72) Inventors: Sungwook Hwang, Suwon-si (KR); Tae Soo Shin, Suwon-si (KR); Seulgi Ok, Suwon-si (KR); Kibum Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 392 days.

(21) Appl. No.: 18/195,190

(22) Filed: May 9, 2023

(65) Prior Publication Data

US 2024/0127425 A1 Apr. 18, 2024

(30) Foreign Application Priority Data

Oct. 18, 2022 (KR) ........................ 10-2022-0134334

(51) Int. Cl.
| | |
|---|---|
| *G01N 23/2251* | (2018.01) |
| *G06T 7/00* | (2017.01) |
| *G06T 7/70* | (2017.01) |

(52) U.S. Cl.
CPC ......... *G06T 7/001* (2013.01); *G01N 23/2251* (2013.01); *G06T 7/70* (2017.01); *G01N 2223/418* (2013.01); *G01N 2223/6116* (2013.01); *G06T 2207/10061* (2013.01); *G06T 2207/20084* (2013.01); *G06T 2207/20132* (2013.01); *G06T 2207/30148* (2013.01)

(58) Field of Classification Search
CPC . G06T 7/001; G06T 7/70; G06T 2207/10061;

G06T 2207/20084; G06T 2207/30148; G06T 2207/20081; G06T 7/0004; G01N 23/2251; G01N 2223/418; G01N 2223/6116; G01N 21/9501; G01N 21/01; G01N 21/8851; G06V 10/764; G06V 10/82

See application file for complete search history.

(56) References Cited

U.S. PATENT DOCUMENTS

| | | | |
|---|---|---|---|
| 6,846,597 | B2 | 1/2005 | Narukawa et al. |
| 8,229,205 | B2 | 7/2012 | Hyon et al. |
| (Continued) | | | |

FOREIGN PATENT DOCUMENTS

| | | | | |
|---|---|---|---|---|
| KR | 100842751 | B1 * | 7/2008 | ......... H01L 21/0275 |
| KR | 10-2008-0092552 | A | 10/2008 | |
| (Continued) | | | | |

*Primary Examiner* — Stephen R Koziol
*Assistant Examiner* — Ashley Hytrek
(74) *Attorney, Agent, or Firm* — Sughrue Mion, PLLC

(57) ABSTRACT

A defect detection device includes: a memory configured to store a layout image indicating a circuit pattern and indicating a dummy pattern; and a controller comprising an artificial neural network configured to learn the layout image, the controller being configured to: determine, based on an inspection image obtained by photographing an area including a defect on a wafer, whether the defect is in a first area in which the circuit pattern is positioned or in a second area in which the dummy pattern is positioned, by using the artificial neural network, and determine a type of the defect based on whether the defect is positioned is in the first area or in the second area.

18 Claims, 7 Drawing Sheets

(56)References Cited

U.S. PATENT DOCUMENTS

| | | | | |
|---|---|---|---|---|
| 9,347,862 | B2 | 5/2016 | Lynch | |
| 10,572,995 | B2 | 2/2020 | Inoue et al. | |
| 10,825,650 | B2 | 11/2020 | Chou et al. | |
| 11,227,381 | B2 | 1/2022 | Iwanaga | |
| 2009/0103799 | A1 | 4/2009 | Hyon et al. | |
| 2009/0257645 | A1* | 10/2009 | Chen .............. | G01R 31/318511 |
| | | | | 382/145 |
| 2009/0324057 | A1* | 12/2009 | Silberstein ............. | G06V 10/98 |
| | | | | 382/149 |
| 2010/0303334 | A1* | 12/2010 | Kitamura .............. | H01J 37/265 |
| | | | | 382/141 |
| 2018/0232873 | A1* | 8/2018 | Inoue ...................... | G06T 7/001 |
| 2020/0105500 | A1* | 4/2020 | Chou ................... | H01J 37/261 |

FOREIGN PATENT DOCUMENTS

| | | | | | |
|---|---|---|---|---|---|
| KR | 20080092552 | A | * | 10/2008 | ......... G01N 21/9501 |
| KR | 10-1328611 | B1 | | 11/2013 | |
| WO | WO-2021027184 | A1 | * | 2/2021 | .............. G06T 7/73 |

* cited by examiner

DEFECT DETECTION DEVICE AND METHOD THEREOF

CROSS-REFERENCE TO RELATED APPLICATION

This application claims priority to Korean Patent Application No. 10-2022-0134334, filed on Oct. 18, 2022 in the Korean Intellectual Property Office, the entire contents of which are incorporated herein by reference.

BACKGROUND

1. Field

The present disclosure relates to a defect detection device and a method thereof.

2. Description of the Related Art

As a semiconductor device is miniaturized, an etching loading effect in which an etching rate is changed may occur depending on a difference in an etch area exposed to an etchant during an etching process for forming a pattern or a density difference of the pattern. Uniform etching may be performed on a wafer by introducing a dummy pattern that does not substantially affect a circuit configuration of a semiconductor device to suppress the etch loading effect.

A method may be performed of photographing a circuit pattern using a pattern measuring device, inspecting an error of the pattern on the photographed image, and detecting it as a defect is used in order to check whether a circuit pattern of a semiconductor device is well formed on an actual wafer. However, because this method detects a dummy pattern error as a defect in addition to such a circuit pattern error, there is a problem of time and money being consumed to analyze defects.

The above information disclosed in this Background section is only for enhancement of understanding of the background of the disclosure, and therefore, it may contain information that does not form the prior art that is already known in this country to a person of ordinary skill in the art.

SUMMARY

One or more embodiments provide a defect detection device that detects a defect and determines a type of a defect.

According to an aspect of an example embodiment, a defect detection device includes: a memory configured to store a layout image indicating a circuit pattern and indicating a dummy pattern; and a controller comprising an artificial neural network configured to learn the layout image, the controller being configured to: determine, based on an inspection image obtained by photographing an area including a defect on a wafer, whether the defect is in a first area in which the circuit pattern is positioned or in a second area in which the dummy pattern is positioned, by using the artificial neural network, and determine a type of the defect based on whether the defect is positioned is in the first area or in the second area.

According to an aspect of an example embodiment, a defect detection method includes: generating a second inspection image by converting a first inspection image into a layout form, wherein the first inspection image is obtained by photographing a wafer including a defect; inputting the second inspection image to an artificial neural network which has been trained based on a layout image indicating a circuit pattern and indicating a dummy pattern; determining, using the artificial neural network, whether the defect is positioned in a first area in which the circuit pattern is positioned or in a second area in which the dummy pattern is positioned; and determining a type of the defect based on whether the defect is positioned is the first area or in the second area.

According to an aspect of an example embodiment, a defect detection system includes: an inspection device configured to generate an inspection image by photographing a wafer including a defect; an artificial neural network configured to learn a layout image indicating a circuit pattern and indicating a dummy pattern; and a defect detection device configured to: determine, using the artificial neural network, whether the defect is positioned in the inspection image in a first area where the circuit pattern is positioned or in a second area where the dummy pattern is positioned, and determine a type of the defect based on whether the defect is positioned in the first area or in the second area.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 illustrates a detection system according to an embodiment;

FIG. 3 illustrates an artificial neural network according to an example embodiment;

FIG. 5 and FIG. 6 each illustrate examples of an inspection image and an inspection image converted to a layout form according to an example embodiment.

DETAILED DESCRIPTION

Figure 2:
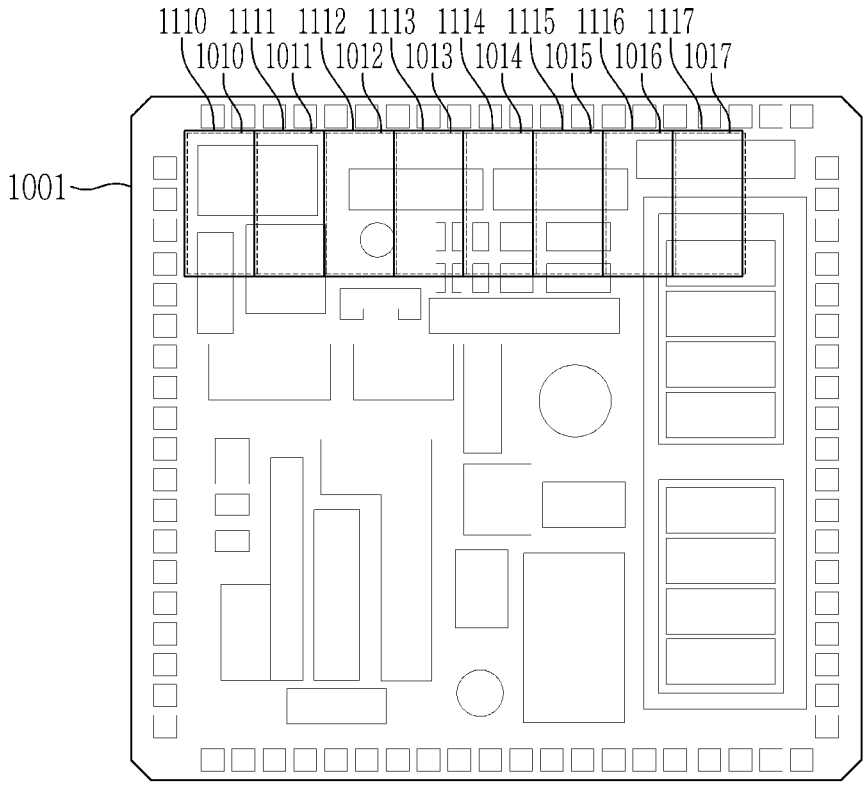
FIG. 2 illustrates an example of a layout image according to an example embodiment.

In the following detailed description, certain example embodiments of the present disclosure are shown and described, by way of illustration. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification.

In addition, expressions written in the singular may be construed in the singular or plural unless an explicit expression such as "one" or "single" is used. Terms including ordinal numbers such as first, second, and the like will be used only to describe various components, and are not to be interpreted as limiting these components. These terms may be used for the purpose of distinguishing one constituent element from other constituent elements.

Figure 1:
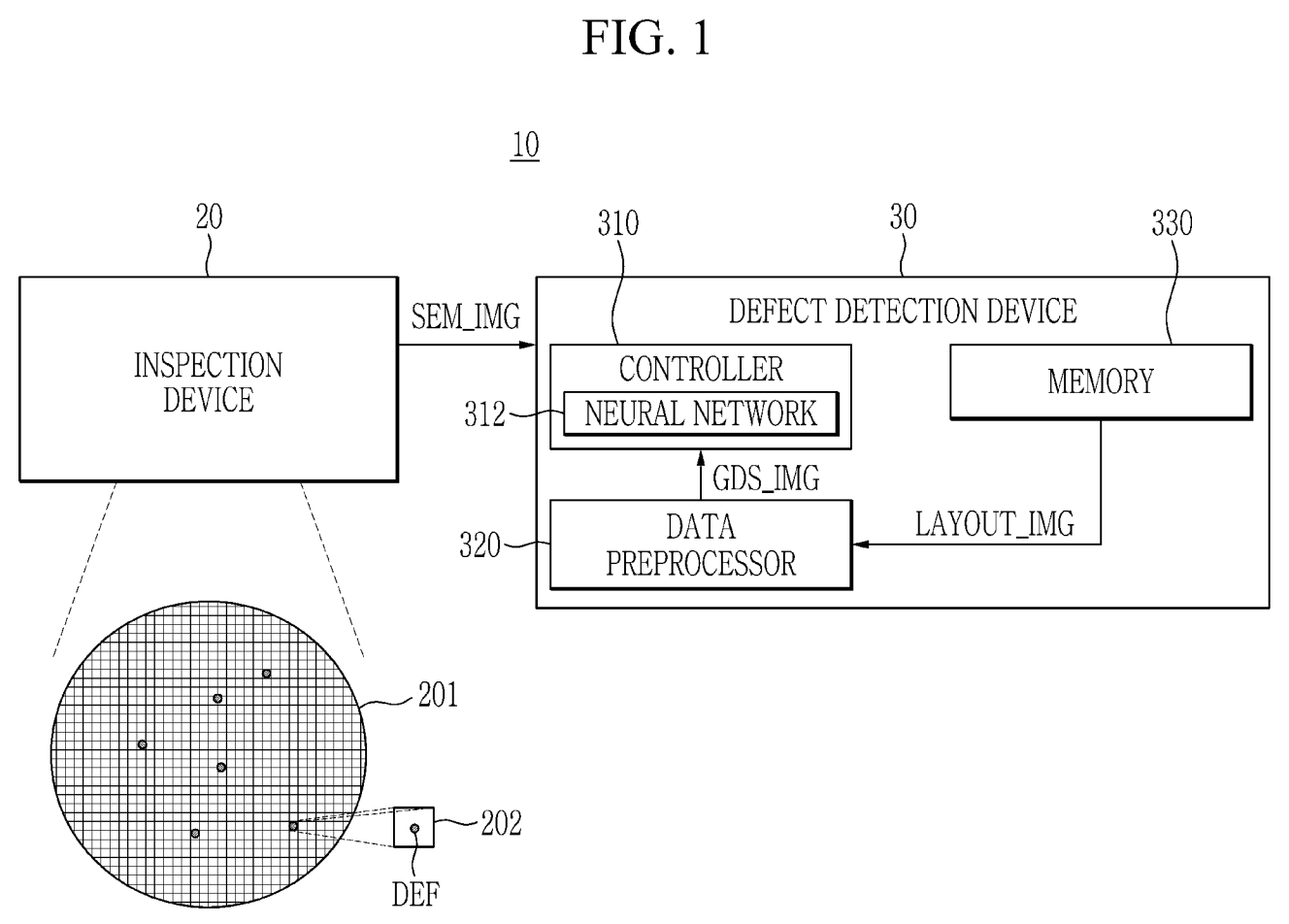

FIG. 1 illustrates a detection system according to an embodiment.

Referring to FIG. 1, the detection system 10 may include an inspection device 20 and a defect detection device 30. In an embodiment, the detection system 10 may detect a defect DEF generated in a wafer 201 by imaging the wafer 201.

Dies on the wafer may include memory cells or other transistor-based circuits, and memory cells and other transistor-based circuits on a given die may include gate lines.

The wafer 201 may include a plurality of dies 202. Each of the dies 202 may be formed of a semiconductor circuit such as a memory device, an integrated circuit, or the like. A circuit pattern may be formed on each of the dies 202. Some of the dies 202 may include the defect DEF. The defect DEF may indicate that a normal pattern is not formed on the wafer 201 due to various factors such as particles introduced from the outside, abnormality of process equipment, by-products generated in a process, and the like.

The inspection device 20 may detect the defect DEF generated on a surface of the wafer 201. For example, the inspection device 20 may inspect an entire surface of the wafer 201 using an optical facility. The inspection device 20 may detect defects DEF included in the wafer 201 based on an inspection result thereof.

In some embodiments, the inspection device 20 may include a scanning electron microscope (SEM) for acquiring an image of the wafer 201. The inspection device 20 may acquire an image of a region (e.g., one die) in which the detected defect is positioned through an electron microscope.

The inspection device 20 may photograph an inspection image SEM_IMG of the detected defects DEF. The inspection device 20 may transmit the photographed inspection image SEM_IMG to the defect detection device 30. In this case, a size of the inspection image SEM_IMG may correspond to a size that the inspection device 20 can photograph at one time.

In some embodiments, the inspection device 20 may generate the inspection image SEM_IMG by imaging a region including the defects DEF in the wafer 201. The inspection device 20 may generate an inspection image SEM_IMG by imaging a region adjacent to the region including the defects DEF in the wafer 201.

The defect detection device 30 may include a controller 310, a data preprocessor 320, and a memory 330. Functions of embodiments disclosed herein may be performed, for example, by a processor such as a CPU and a memory containing instructions for execution by the processor or by a dedicated hardware circuit. The defect detection device 30 may determine a position of the detected defect, and may determine a type of the detected defect.

First, the data preprocessor 320 may receive a plurality of layout images LAYOUT_IMG from the memory 330. Although it has been described that the data preprocessor 320 is positioned in the defect detection device 30, it may be separately positioned outside the defect detection device 30.

A plurality of layout images may be design images for a pattern to be formed on the wafer, i.e., a pattern to be formed on the wafer 201. The pattern corresponding to the layout images may be formed on the wafer 201. Specifically, a layout of a pattern to be transferred onto the wafer 201 may be designed, and the designed layout may be transferred onto an actual wafer 201 to form a pattern. The pattern formed on the wafer 201 may be a resist pattern or film quality formed by being etched by a photoresist pattern.

In some embodiments, the layout image may be a graphic data system (GDS) image.

In some embodiments, one layout image may include a circuit area image including a circuit pattern and a dummy image including a dummy pattern.

The circuit area image may include an image of a circuit pattern within one wafer 201. The circuit pattern may be any structure or feature for an operation of a semiconductor device. For example, the circuit pattern may be a pattern for a gate line.

In addition, the dummy area image may include an image of a dummy pattern within one wafer 201. The dummy pattern may be any structure or features that do not contribute to the operation of the semiconductor device. The dummy pattern may alleviate an etch loading effect that occurs during a manufacturing process of the semiconductor device. The planar shape of the dummy pattern may have any shape such as a polygon shape, a circular shape, or an elliptical shape.

The data preprocessor 320 may divide the circuit area image into a plurality of first cropped images. In addition, the data preprocessor 320 may divide the dummy area image into a plurality of second cropped images. In some embodiments, each of the first cropped images and the second cropped images may be an image having a same size as that of the inspection image SEM_IMG of the inspection device 20.

An operation of the data preprocessor 320 will be described with reference to FIG. 2. FIG. 2 illustrates an example of a layout image according to an embodiment.

Referring to FIG. 2, one layout image 1001 may include a circuit area image and a dummy area image. In FIG. 2, the circuit area image and the dummy area image are illustrated to be superimposed on one wafer.

The data preprocessor 320 may divide the circuit area image into a plurality of first cropped images 1010, 1011, 1012, 1013, 1014, 1015, 1016, and 1017. In addition, the data preprocessor 320 may divide the dummy area image into a plurality of second cropped images 1110, 1111, 1112, 1113, 1114, 1115, 1116, and 1117. In FIG. 2, eight first cropped images and eight second cropped images are illustrated, but embodiments are not limited thereto, and the data preprocessor 320 may divide one layout image into a larger or smaller number of first cropped images and second cropped images.

In some embodiments, each of the first cropped images 1010, 1011, 1012, 1013, 1014, 1015, 1016, and 1017 may be an image having a same size as that of the inspection image SEM_IMG of the inspection device 20. In addition, each of the second cropped images 1110, 1111, 1112, 1113, 1114, 1115, 1116, and 1117 may be an image having a same size as that of the inspection image SEM_IMG.

The data preprocessor 320 may transmit the generated image GDS_IMG including the plurality of first cropped images and the plurality of second cropped images to the defect detection device 30. That is, the data preprocessor 320 may transmit the generated image GDS_IMG including the first cropped images 1010, 1011, 1012, 1013, 1014, 1015, 1016, and 1017 and the second cropped images 1110, 1111, 1112, 1113, 1114, 1115, 1116, and 1117 to the controller 310.

The controller 310 analyzes the inspection image SEM_IMG received from the inspection device 20 to determine whether a defect in the received inspection image SEM_IMG is included in any of a circuit pattern area and a dummy pattern area.

The controller 310 may include an artificial neural network 312. In some embodiments, the controller 310 may determine in which pattern area the defect in the inspection image SEM_IMG is included using the artificial neural network 312. Specifically, the controller 310 may train the artificial neural network 312 by training based on the first cropped image and the second cropped image received from the data preprocessor 320 to determine in which pattern area the defect in the received inspection image SEM_IMG is included.

The artificial neural network 312 includes a plurality of layers, and the layers are connected through a plurality of operations to which weights are applied. In other words, the artificial neural network 312 includes a plurality of layers including a plurality of operations to which weights are applied. Herein, the layers including a plurality of operations may include a convolution layer that performs a convolution operation, a pooling layer that performs a downsampling operation, an unpooling layer (UL) that performs an upsampling operation, a deconvolution layer (DL) that performs a deconvolution operation, a fully connected layer, etc. In some embodiments, the controller 310 may include a convolutional neural network (CNN). The artificial neural network 312 in the controller 310 will be described with reference to FIG. 3.

Figure 3:
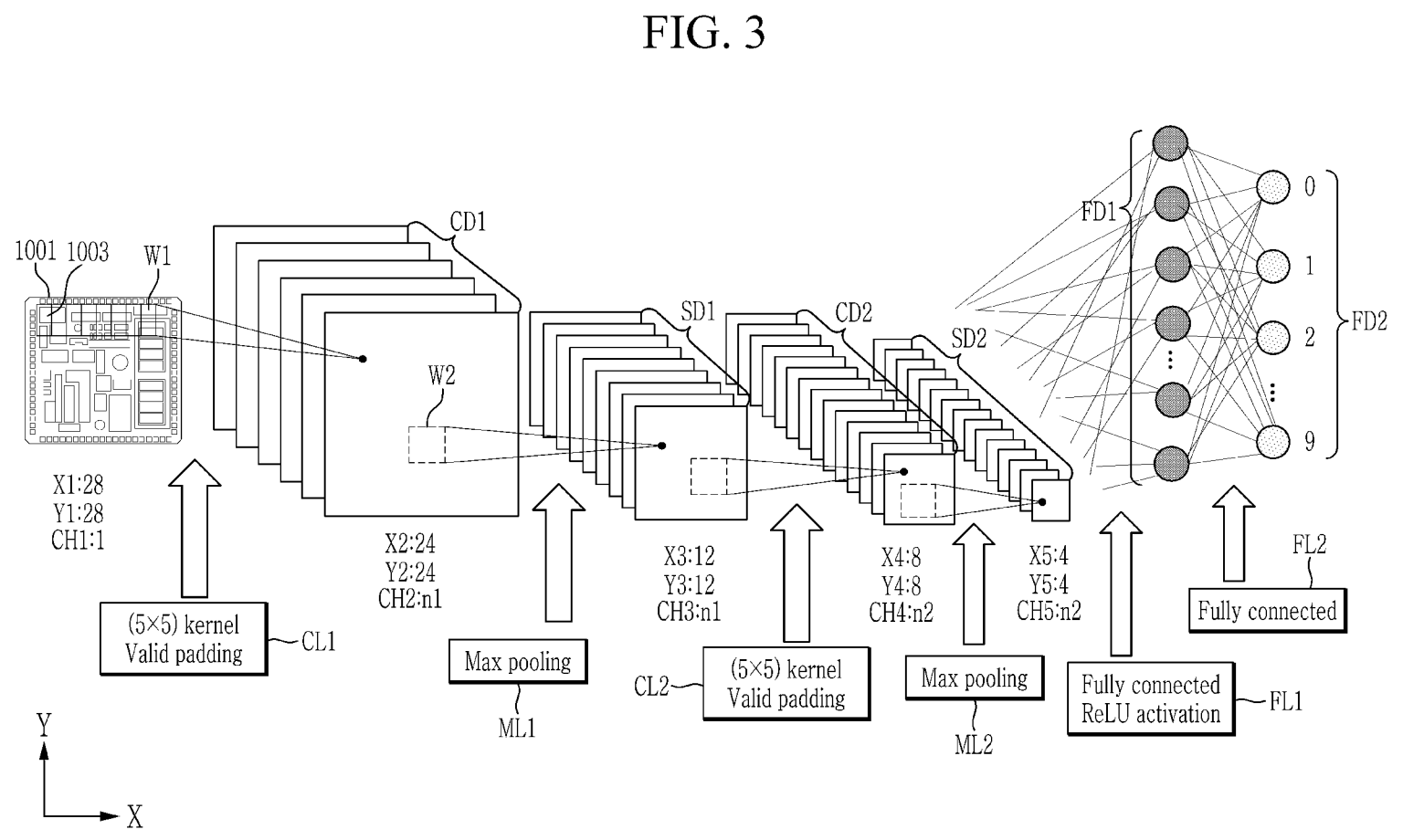

FIG. 3 illustrates an artificial neural network according to an embodiment.

Specifically, FIG. 3 illustrates an example in which a characteristic is extracted in one layout image 1001 by a plurality of layers of the artificial neural network 312. Each layer will be described below in detail using various numerical values, but embodiments are not limited thereto, and may be variously applied and changed depending on a form of inputted images or a stack form of layers.

The artificial neural network 312 illustrated in FIG. 3 may be implemented as an architecture having multiple layers including an input image, feature maps, and an output. In the artificial neural network 312, a convolution operation is performed on the input image with a filter called a weight or a kernel, and as a result, the feature maps are outputted. In this case, the generated output feature maps are input feature maps, and the convolution operation with the kernel filter is performed again, and new feature maps are outputted. The artificial neural network 312 may filter and output features that can represent an entire image from the input image by repeatedly performing convolution and subsampling (or pooling) operations in multiple layers, and as the outputted features are inputted to a fully connected layer. Finally, a recognition result for the input image is derived.

The controller 310 may receive a plurality of first cropped images into which a circuit area image including a circuit pattern is divided and a plurality of second crop images into which a dummy area image including a dummy pattern is divided, from the data preprocessor 320. The artificial neural network 312 is trained to output area data indicating the circuit pattern when the first cropped images are inputted, and may be trained to output area data indicating the dummy pattern when the second crop images are inputted.

As illustrated in FIG. 3, one cropped image 1003 may have a size of 28 in a horizontal direction (X1), 28 in a vertical direction (Y1), and 1 in channel (CH1). The cropped image 1003 may be a first cropped image or a second cropped image. The first cropped image may be labeled as a circuit pattern and the second cropped image may be labeled as a dummy pattern to be inputted to the artificial neural network 312. For example, the size of the cropped image 1003 may indicate a number of pixel data.

A first convolutional layer CL1 may be applied to the cropped image 1003. The first convolutional layer CL1 may have a kernel of a size of 5 in a horizontal direction (X), 5 in a vertical direction (Y1), and 1 in a channel (CH1). In addition, "VALID" may be set by using a padding method of the first convolutional layer CL1. Herein, "VALID" may indicate no padding.

A number of kernels of the first convolutional layer CL1 may be the same as a number of channels of data outputted through the first convolutional layer CL1. For example, the size of the kernel of the first convolutional layer CL1 may be the number of channels calculated with the cropped image 1003.

When the first convolutional layer CL1 is applied to the cropped image 1003, one kernel may be selected from among the plurality of kernels. One selected kernel may be computed with the crop image 1003 as a first window W1. The first window W1 may move depending on a predetermined direction on the cropped image 1003. In some embodiments, a size of the first window W1 may be the same as a size of one inspection image SEM_IMG.

Since the size of the kernels of the first convolutional layer CL1 is 5 in the horizontal direction (X) and 5 in the vertical direction (Y), the size of each channel of a first convolutional data CD1 is smaller than the size of the cropped image 1003. For example, when a space in which the first window W1 may move on the cropped image 1003 is calculated based on an uppermost leftmost point of the first window W1, the first window W1 may be positioned at 24 different positions in the horizontal direction (X1), and may be positioned at 24 different positions in the vertical direction (Y1).

Accordingly, the first convolutional data CD1 may have a size of 24 in a horizontal direction (X2), 24 in a vertical direction (Y2), and n1 in a channel (CH3). For example, the size of the first convolution data CD1 may be measured as a number of sample data.

A subsampling layer ML1 may be applied to the first convolutional data CD1. In FIG. 3, the artificial neural network 312 is illustrated as using a max pooling method, which is a method of using a maximum value among multiple pieces of feature information, but embodiments are not limited thereto, and a method such as average-pooling, which is a method of using an average value of the multiple pieces of characteristic information, may be applied. The kernel of the subsampling layer ML1 may have a size of 2 in the horizontal direction (X), 2 in the vertical direction (Y), and 1 in a channel. Herein, the pooling refers to generating one pixel capable of representing a characteristic by synthesizing a plurality of pixels having multiple pieces of characteristic information.

Accordingly, the artificial neural network 312 may output feature maps of the n1 channels, having a size of 12×12 because only some of pixel values of the feature maps of the n1 channels with a size of 24×24 are used, through the subsampling layer ML1.

The kernel of the subsampling layer ML1 may be selected as a second window W2. The second window W2 may move on the first convolutional data CD1. For example, the n1 channels of the first convolution data CD1 are sequentially selected, and the second window W2 may move in the selected channel.

In the selected channel, the second window W2 may move in a same manner as that of the first window W1. The subsampling may be performed at each position of the second window W2. For example, the subsampling may include selecting data having a maximum value among data belonging to each position of the second window.

According to a result of subsampling of the selected position of the selected channel, one piece of data (e.g., sample data) at a corresponding position of a channel corresponding to output data (e.g., a first subsampling piece of data SD1) of the subsampling layer ML1 may be formed.

The first subsampling data SD1 may have a size of 12 in a horizontal direction (X3), 12 in a vertical direction (Y3), and n1 in a channel (CH3). For example, the size of the first subsampling data SD1 may be measured as a number of pieces of sample data.

A second convolutional layer CL2 may be applied to the first subsampling data SD1.

The kernel of the second convolutional layer CL2 may have a size of 5 in the horizontal direction (X), 5 in the vertical direction (Y), and n2 in a channel. A number of channels of the kernel of the second convolutional layer CL2 may be the same as a number of channels CH3 of the first subsampling data SD1. Accordingly, the second convolutional layer CL2 may be applied to the first sub-sampling data SD1 in a same manner as that of the first convolutional layer CL1.

Result data to which the second convolutional layer CL2 is applied may be the second convolutional data CD2. Accordingly, the second convolutional data CD2 may have a size of 8 in a horizontal direction (X4), 8 in a vertical direction (Y4), and n2 in a channel (CH4). The size of the second convolutional data CD2 may indicate a number of pieces of sample data.

A subsampling layer ML2 may be applied to the second convolutional data CD2. The kernel of the second subsampling layer ML2 may have a size of 2 in the horizontal direction (X), 2 in the vertical direction (Y), and 1 in a channel. The second subsampling layer ML2 may be applied to the second convolutional data CD2 in a same way that the first sub-sampling layer ML1 is applied to the first convolutional data CD1.

Result data to which the second subsampling layer ML2 is applied may be the second subsampling data SD2. The first subsampling data SD2 may have a size of 4 in a horizontal direction (X5), 4 in a vertical direction (Y5), and n2 in a channel (CH5). The size of the second subsampling data SD2 may indicate a number of pieces of sample data.

A first fully connected layer FL1 may be applied to the second subsampling data SD2. A kernel of the first fully connected layer FL1 may have a size of 4 in a horizontal direction (X), and the size in the vertical direction (Y) may correspond to a number of sample data of a first fully connected data FD1 that is a result of applying the first fully connected layer FL1.

However, the size of the kernel of the first fully connected layer FL1 may vary depending on a structure of the fully connected layer, a number of hidden layers, and the like. The first fully connected layer FL1 may include an active layer (ReLU activation). A kernel of the active layer is for limiting values of the sample data to values within a predetermined range, and may be, e.g., a sigmoid function.

A second fully connected layer FL2 may be applied to the first fully connected data FD1 that is a result of applying the first fully connected layer FL1. The second fully connected layer FL2 may have a size of 4 in the horizontal direction (X), and the size in the vertical direction (Y) may correspond to a number of pieces of sample data of a second fully connected data FD2 that is a result of applying the second fully connected layer FL2. However, a size of the second pulley-connected kernel FM2 may vary depending on a structure of the fully connected layer, a number of hidden layers, and the like.

In summary, the artificial neural network 312 of FIG. 3 may learn the circuit area image and the dummy area image in the layout image 1001 by using the cropped image 1003 as input data. When the inspection image SEM_IMG is inputted, the artificial neural network 312 that has learned the circuit area image and the dummy area image may recognize a pattern in the inspection image SEM_IMG, and the neural network may output area data indicating whether the recognized pattern is a dummy pattern or a circuit pattern.

Referring back to FIG. 1, the controller 310 may determine which pattern area includes a defect in the inspection image SEM_IMG based on area data outputted from the artificial neural network 312.

In addition, the controller 310 may determine a type of the defect based on a type of the pattern area in which the defect is positioned in the inspection image SEM_IMG.

The memory 330 may include data necessary for the controller 310 to determine the type of defect in the inspection image SEM_IMG.

In some embodiments, the memory 330 may include data necessary for the controller 310 to convert the inspection image SEM_IMG into a layout form.

For example, data required to convert the inspection image SEM_IMG into the layout form may include data related to a design rule. The design rule may include predetermined rules to be considered when designing a pattern. For example, the design rule may include setting a width of a circuit pattern, a distance between adjacent circuit patterns, minimum and maximum widths of gate lines in the circuit pattern, a distance between adjacent gate lines, and the like.

As another example, the data required to convert the inspection image SEM_IMG into the layout form may include line width conversion data. The line width conversion data may include data representing a correspondence relationship between a line width of a gate line on the inspection image SEM_IMG and the line width of the gate line on a layout image. For example, when a pattern having a line width of about 10 nm is actually exposed on a layout, it may be transferred to a pattern having a line width of about 9.7 nm on a wafer. In this case, line width data may include data indicating that 9.7 nm on the inspection image SEM_IMG corresponds to 10 nm on the layout.

Figure 4:
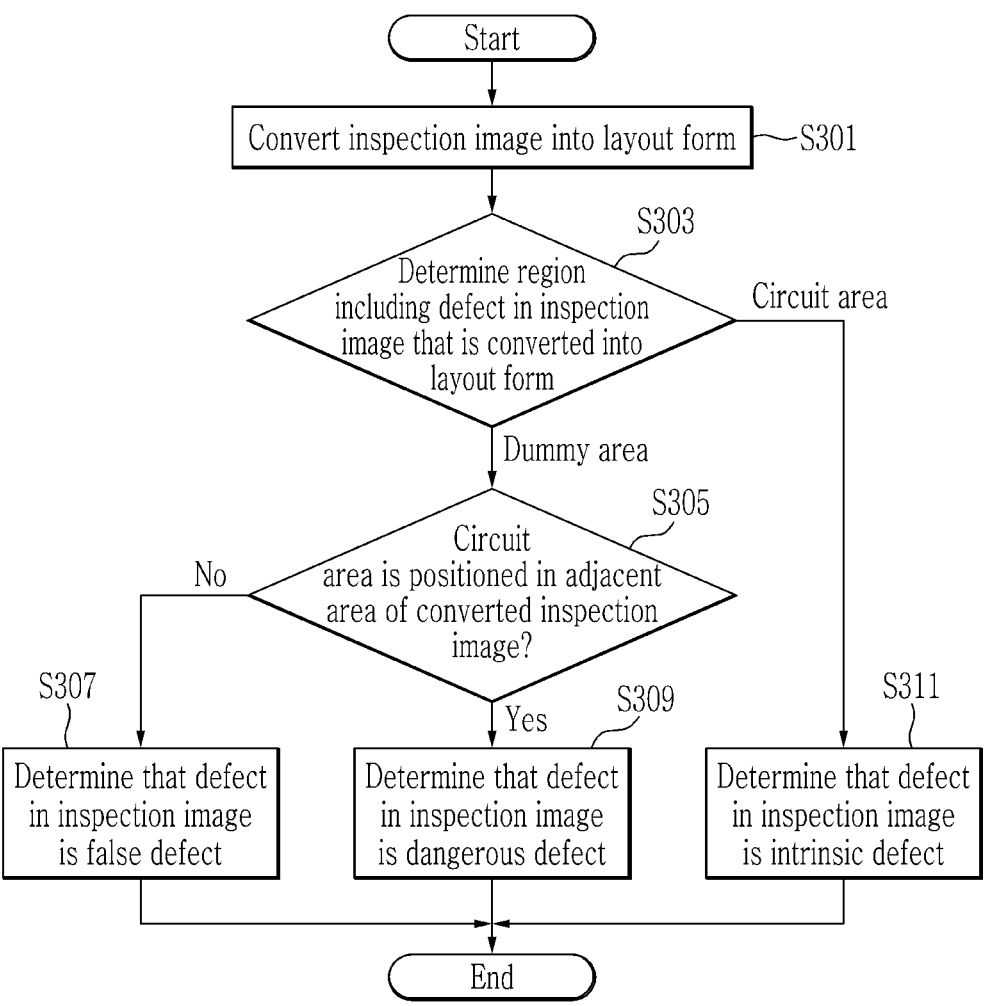
FIG. 4 illustrates a flowchart showing a defect detection method of a controller according to an example embodiment.

FIG. 4 illustrates a flowchart showing a defect detection method of a controller according to an embodiment.

First, the controller 310 converts the inspection image SEM_IMG received from the inspection device 20 into a layout form (S301).

Specifically, the controller 310 may convert the inspection image SEM_IMG into the layout form in consideration of the design rule. In addition, the controller 310 may convert the inspection image SEM_IMG into the layout form in consideration of optical proximity correction (OPC). The OPC method may be a method of intentionally changing a mask pattern in order to overcome pattern distortion caused by an optical proximity effect during a photolithography process. For example, the OPC method may be a correction method in which a serif is attached to an edge of a pattern.

Figure 5:
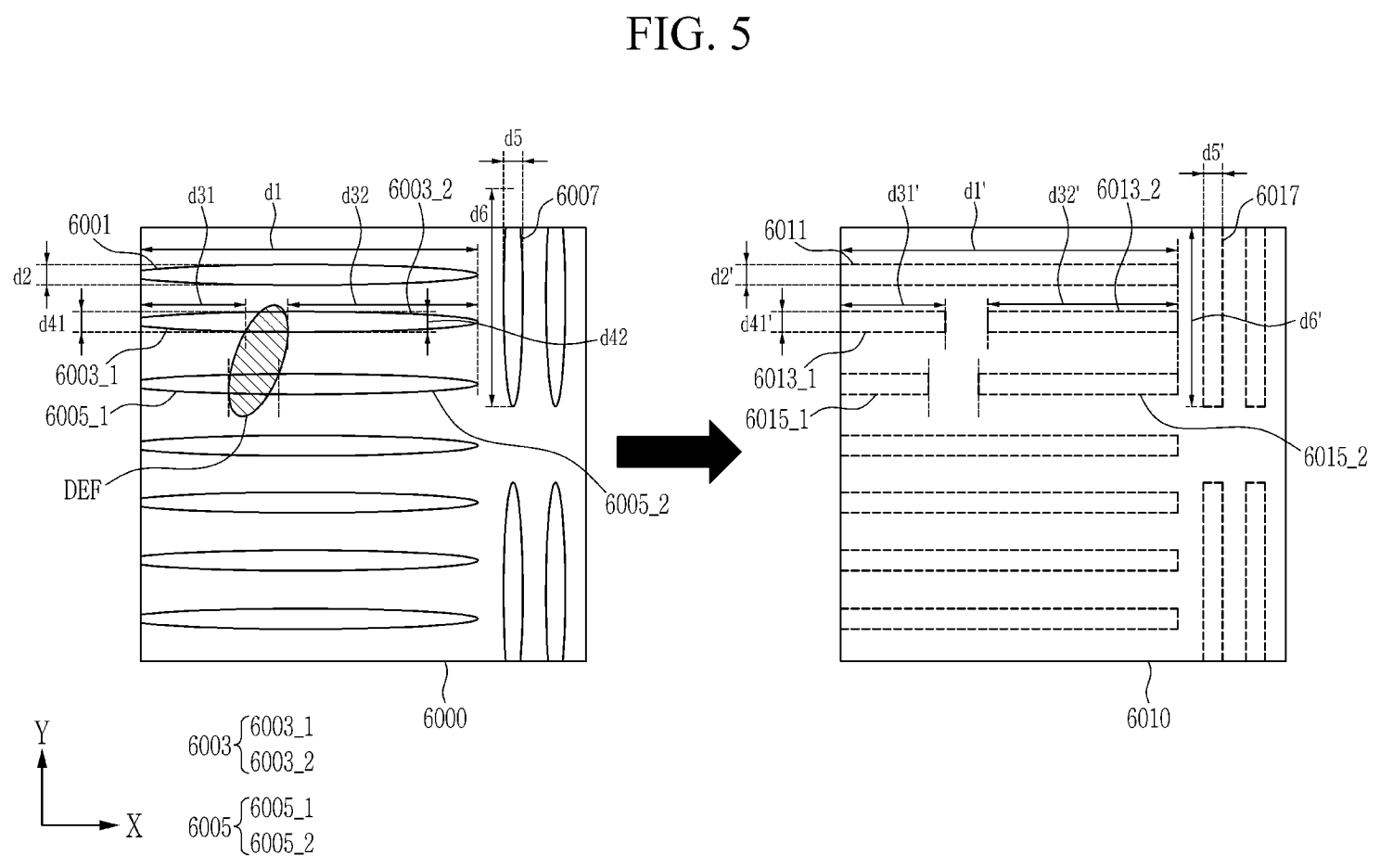
Figure 6:
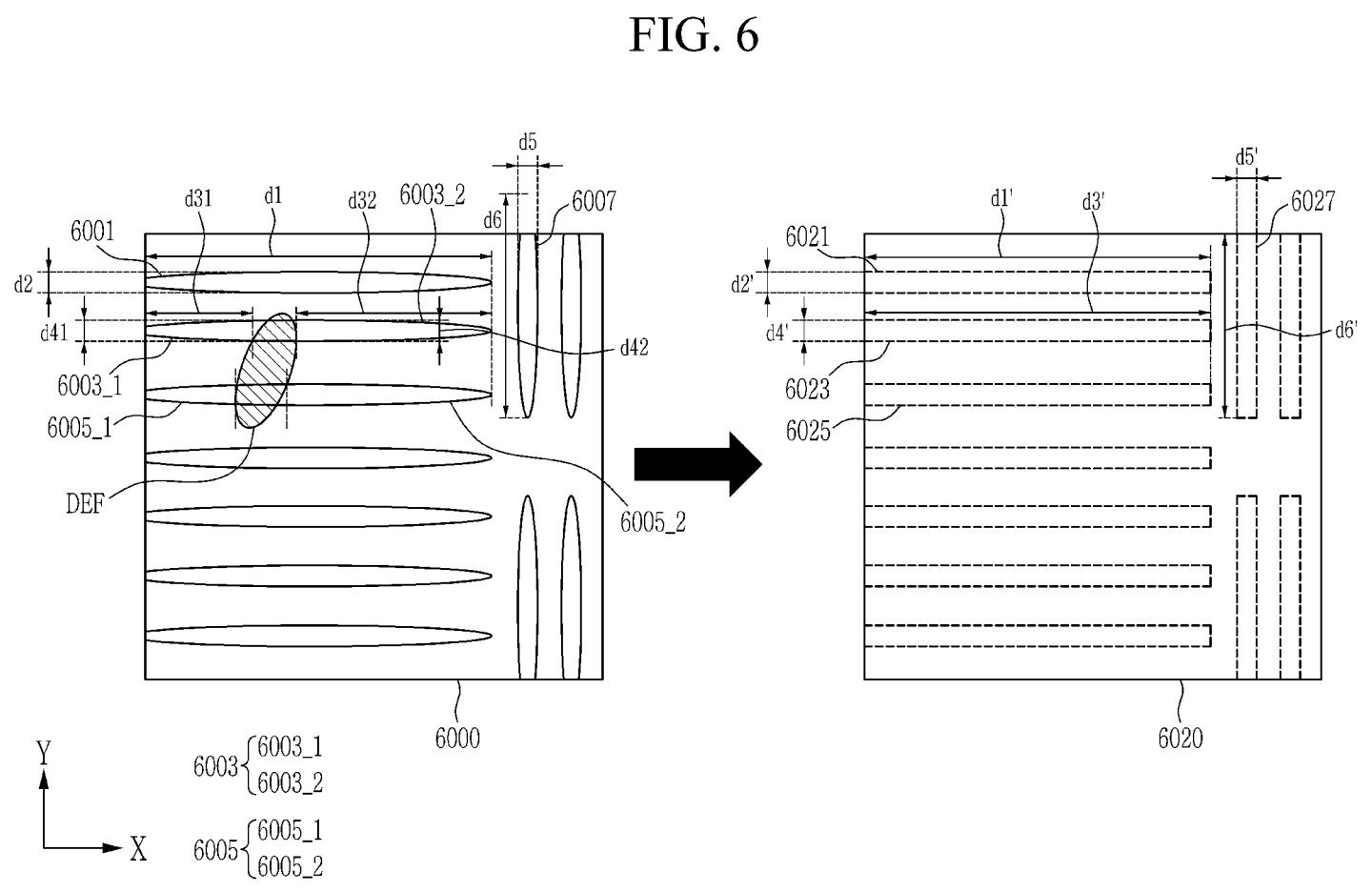

With respect to a step of converting the inspection image SEM_IMG into a layout form, FIG. 5 and FIG. 6 are also referred to. FIG. 5 and FIG. 6 each illustrate examples of an inspection image and an inspection image converted to a layout form according to an embodiment. When the right hand portions of each of FIGS. 5 and 6 are obtained from the same inspection image, two possible layout forms have been obtained from the same inspection image. In some embodiments, an operator (a human being or a trained neural network, for example) may then identify which layout form is to be used for production of a second wafer. Production of a second wafer is described below with respect to FIG. 7.

Referring to FIG. 5, an inspection image 6000 received from the inspection device 20 and an inspection image 6010 converted into a layout form are illustrated.

The inspection image 6000 may include a first gate line 6001, a second gate line 6003, and a third gate line 6005 extending in an X-axis direction, a fourth gate line 6007 extending in an Y-axis direction, and a defect DEF.

The controller 310 may convert a gate line in the inspection image 6000 into a straight shape even though it has a curved shape based on the design rule. For example, the controller 310 may planarize the edge region of each gate line in the X direction and the Y direction, and may represent a rounded portion of the edge region of each gate line as a right angle.

Specifically, the controller 310 may measure a first line width d1 in the X-axis direction and a second line width d2 in the Y-axis direction with respect to the first gate line 6001. See FIG. 5, the left hand drawing, near the top. The controller 310 may determine a direction of the first gate line 6001 based on a ratio of the first line width d1 to the second line width d2. Thereafter, the controller 310 may convert the first gate line 6001 to a first line 6011 based on the line width conversion data. Specifically, the line width conversion data may include data indicating that the first line width d1 of the inspection image corresponds to a first line width d1' and the second line width d2 corresponds to a second line width d2'. See FIG. 5, the right hand drawing, near the top.

The controller 310 may measure a $31^{st}$ line width d31 in the X-axis direction with respect to a first portion 6003_1 of the second gate line 6003 and a $32^{nd}$ line width d32 in the X-axis direction with respect to a second portion 6003_2 of the second gate line 6003. In addition, the controller 310 may measure a $41^{st}$ line width d41 in the Y-axis direction with respect to the first portion 6003_1 of the second gate line, and a $42^{nd}$ line width d42 in the Y-axis direction with respect to the second portion 6003_2 of the second gate line. Since the $41^{st}$ line width d41 and the $42^{nd}$ line width d42 are both line widths in the Y-axis direction for one gate line 6003, the $41^{st}$ line width d41 and the $42^{nd}$ line width d42 may be the same.

The controller 310 may determine a direction of the first portion 6003_1 based on a ratio of the $31^{st}$ line width d31 to the $41^{st}$ line width d41. Thereafter, the controller 310 may convert the first portion 6003_1 of the second gate line 6003 into a second_1 line 6013_1 based on the line width conversion data. Specifically, the line width conversion data may include data indicating that the $31^{st}$ line width d31 of the inspection image corresponds to the $31^{st}$ line width d31' and the $41^{st}$ line width d41 corresponds to the $4^{th}$ line width d4'. Similarly, the controller 310 may determine a direction of the second portion 6003_2 based on a ratio of the $32^{nd}$ line width d32 to the $41^{st}$ line width d41. Thereafter, the controller 310 may convert the second portion 6003_2 of the second gate line 6003 into a second_2 line 6013_2 based on the line width conversion data. Specifically, the line width conversion data may include data indicating that the $32^{nd}$ line width d32 of the inspection image corresponds to the $32^{nd}$ line width d32' and the $41^{st}$ line width d42 corresponds to the $4^{th}$ line width d4'.

The controller 310 may convert a third gate line 6005 similarly to the method of converting the second gate line 6003. The controller 310 may convert a first portion 6005_1 of the third gate line 6005 into a third_1 line 6015_1 based on the line width conversion data. Thereafter, the controller 310 may convert a second portion 6005_2 of the second gate line 6005 into a third_2 line 6015_2 based on the line width conversion data.

Meanwhile, the defect DEF may be positioned across the second gate line 6003 and the third gate line 6005. See the ellipse marked on the left hand drawing in FIG. 5. The controller 310 may delete the defect DEF based on the design rule. Specifically, the controller 310 may determine that both the gate line 6003 and the gate line 6005 positioned around the defect DEF extend in the X-axis direction. In addition, the controller 310 may measure data related to a line width in the X-axis direction and a line width in the Y-axis direction of the gate line 6003 and the gate line 6005. On the other hand, the defect DEF may be an element extending in the Y-axis direction, and line widths in the X-axis direction and the Y-axis direction of the defect DEF may have values that are completely different from the line widths of the peripheral gate lines 6001, 6003, and 6005. That is, the defect DEF may have different characteristics from surrounding elements. Accordingly, the controller 310 may determine that the defect DEF is an error on the inspection image 6000, and may convert the defect DEF into a layout form by deleting the defect DEF.

In addition, the controller 310 may measure a fifth line width d5 in the X-axis direction and a sixth line width d6 in the Y-axis direction with respect to the fourth gate line 6007. See the upper right portion of the drawing on the left in FIG. 5. Similarly, the controller 310 may determine a direction of the fourth gate line 6007 through a ratio of the fifth line width d5 to the sixth line width d6. Thereafter, the controller 310 may convert the fourth gate line 6007 to a fourth line 6017 based on line width conversion data. Specifically, the line width conversion data may include data indicating that the fifth line width d5 of the inspection image corresponds to a fifth 5' line width d5' and the sixth line width d6 corresponds to a sixth' line width d6'.

In FIG. 6, an inspection image 6000 received from the inspection device 20 and an inspection image 6020 converted into a layout form are illustrated.

FIG. 6 is different from FIG. 5 only in a layout conversion format of the gate line 6003 and the gate line 6005 positioned around the defect DEF, the description of FIG. 5 may be similarly applied to FIG. 6.

Specifically, the controller 310 may convert the first gate line 6001 to a first line 6021 based on the line width conversion data.

Specifically, the controller 310 may determine that both the gate line 6003 and the gate line 6005 positioned around the defect DEF extend in the X-axis direction. In addition, the controller 310 may measure data related to a line width in the X-axis direction and a line width in the Y-axis direction of the gate line 6003 and the gate line 6005. On the other hand, the defect DEF may be an element extending in the Y-axis direction, and line widths in the X-axis direction and the Y-axis direction of the defect DEF may have values that are completely different from the line widths of the peripheral gate lines 6001, 6003, and 6005. That is, the defect DEF may have different characteristics from surrounding elements. Accordingly, the controller 310 may determine that the defect DEF is an error on the inspection image 6000, and may convert the defect DEF into a layout form by deleting the defect DEF.

Meanwhile, the defect DEF may be positioned across the second gate line 6003 and the third gate line 6005. The controller 310 may delete the defect DEF based on the design rule. When the defect DEF is smaller than a predetermined size, or when an element positioned around the defect DEF has similar characteristics, the controller 310 may convert a plurality of elements positioned around the defect DEF into a single element. Specifically, when gate lines separated by the defect DEF and positioned at opposite sides or above and below the defect DEF extend in a same direction or a magnitude of line widths thereof are similar, the controller 310 may determine that elements positioned around the defect DEF have similar characteristics. Accordingly, the controller 310 may convert the first portion 6003_1 and the second portion 6003_2 of the second gate line 6003 into one second line 6023, with width d3', based on the line width conversion data. In addition, the controller 310 may convert the first portion 6005_1 and the second portion 6005_2 of the third gate line 6005 into one third line 6025 based on the line width conversion data.

In addition, the controller 310 may convert the fourth gate line 6007 to a fourth line 6027 based on line width conversion data.

A method of converting another gate line in the inspection image 6000 into a layout form may be similar to a method of converting the gate lines 6001, 6003, 6005, and 6007 in the inspection image 6000 into a layout form, described with reference to FIG. 5.

Referring back to FIG. 4, the controller 310 may determine a region including a defect in the inspection image that is converted into a layout form (S303).

Specifically, the controller 310 may input the inspection image converted into the layout form into the artificial neural network 312, and may determine which pattern area includes a defect in the inspection image SEM_IMG based on area data outputted from the artificial neural network 312.

When a defect in the inspection image SEM_IMG is included in a dummy area, the controller 310 determines whether a circuit area is positioned in an adjacent area of the converted inspection image (S305).

When the circuit area is not positioned in the adjacent area of the converted inspection image, the controller 310 may determine that the defect in the inspection image SEM_IMG is a false defect (S307).

A dummy pattern is a pattern that does not substantially affect a circuit configuration of the semiconductor device, and thus a defect on the dummy pattern may be a false defect that does not affect an operation of an actual circuit.

However, when the circuit area is positioned in the adjacent area of the converted inspection image, the controller 310 may determine that the defect in the inspection image SEM_IMG is a dangerous defect (S309).

Among false defects, when the dummy area including the defect in the inspection image SEM_IMG is included within a predetermined range from the circuit area, the defect in the inspection image SEM_IMG may affect the circuit pattern. In this case, the predetermined range may be a range in which a change in a configuration of the dummy pattern may affect a circuit configuration of the semiconductor device. For example, the controller 310 may determine that when the defective dummy area in the inspection image SEM_IMG is adjacent to the circuit area in the inspection image SEM_IMG, the dummy area is included within the predetermined range from the circuit area. Specifically, when a shortest distance from the position of the defect in the dummy area of the inspection image SEM_IMG to the circuit area is smaller than or equal to a predetermined value, the controller 310 may determine that the dummy area in which the defect occurs in the inspection image SEM_IMG is adjacent to the circuit area in the inspection image SEM_IMG. In some embodiments, the controller 310 may determine whether there is a circuit area adjacent to the defective dummy area using inspection images other than the inspection image SEM_IMG. For example, when a defect occurs in the dummy area in a first inspection image that does not include the circuit area, the controller 310 may determine at least one second inspection image obtained by photographing an area adjacent to the dummy area in the first inspection image. Thereafter, the controller 310 may determine whether a circuit area adjacent to the dummy area in the first inspection image is included in at least one second inspection image. Even in this case, the controller 310 may determine whether the shortest distance from the position of the defect in the dummy area in the first inspection image to the circuit area in the at least one second inspection image is smaller than or equal to a predetermined value, and when it is smaller than or equal to the predetermined value, may determine that the dummy area in which the defect occurs in the inspection image SEM_IMG is adjacent to the circuit area in the inspection image SEM_IMG.

When the defect in the inspection image SEM_IMG is included in the circuit area, the controller 310 may determine that the defect in the inspection image SEM_IMG is an intrinsic defect (S311).

When the defect in the inspection image SEM_IMG is the dangerous defect or the intrinsic defect, the controller 310 may provide appropriate feedback to a semiconductor manufacturing equipment to remove the defect. For example, the semiconductor manufacturing equipment may include equipment performing a deposition process, equipment performing chemical mechanical polishing, equipment performing a photolithography process, equipment performing an etching process, equipment performing an ion implantation process, equipment performing a cleaning process, etc.

Figure 7:
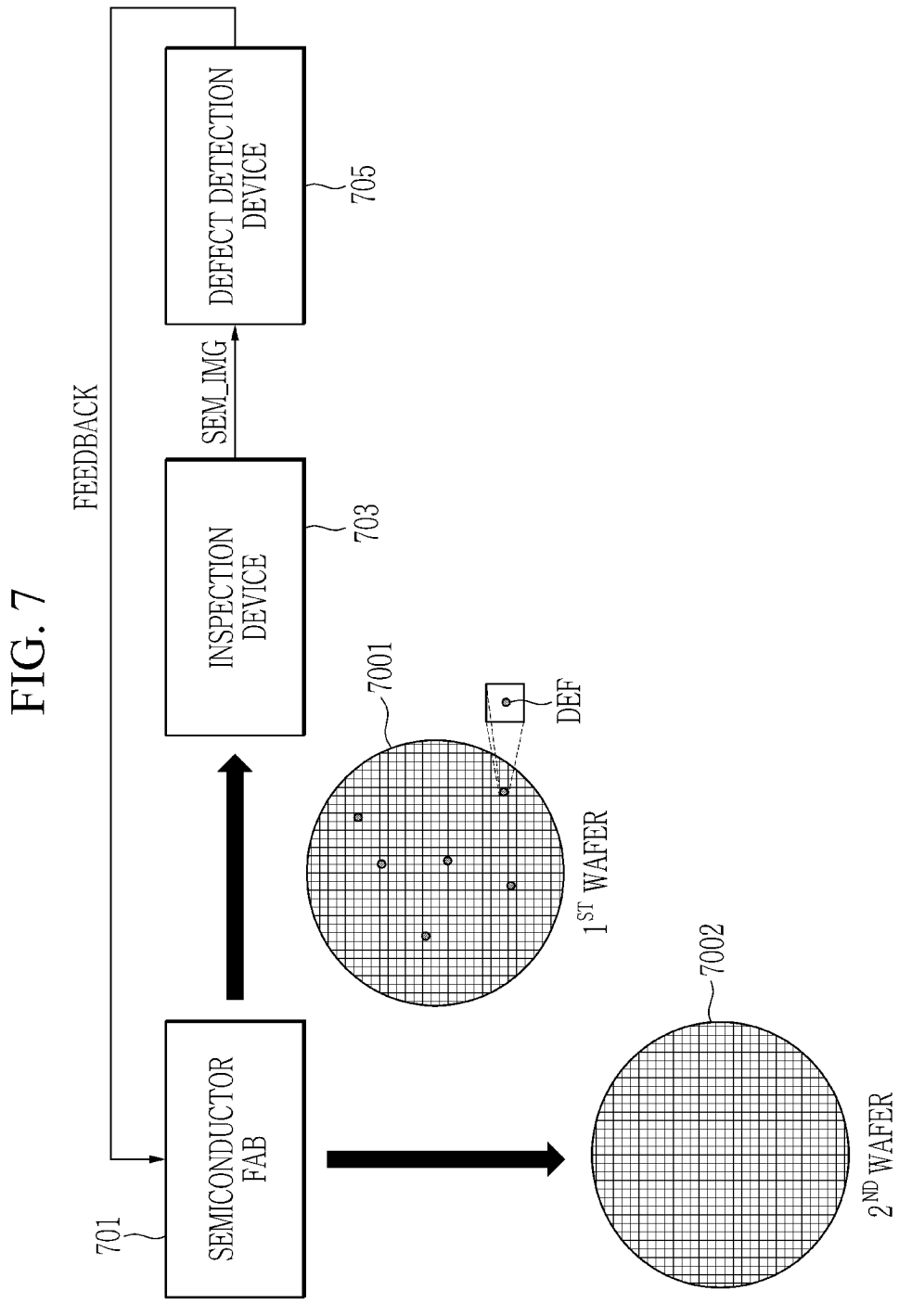
FIG. 7 illustrates an example method of obtaining a second wafer based on a layout form of FIG. 5 or 6.

FIG. 7 illustrates a configuration using OPC, according to one embodiment. As shown in FIG. 7, the defect detection device 705 can generate FEEDBACK based on an inspection image (SEM_IMG) taken of the first wafer 7001. The inspection image (SEM IMG) of the first wafer 7001 may be generated by inspection device 703. In some embodiments, the defect detection device 705 may update the mask with one or more serifs per design rule as needed to obtain the layout format. The updated masks may be stored in memory within the defect detection device 705, or may be stored in other memory of the detection system or the semiconductor equipment mentioned above. The defect detection device 705 may also be implemented by a hardware processor such as a CPU in combination with memory storing instructions executed by the CPU. The defect detection device 705 can provide feedback to the semiconductor fab 701. The semiconductor fab 702 701 includes one or more of the semiconductor manufacturing equipment described above. The semiconductor fab 701 may generate the second wafer 7002 based on the FEEDBACK.

The defect detection device according to the present disclosure may only detect defects that make up the actual semiconductor device or affect an operation of the semiconductor device, thereby reducing time and cost required for defect analysis. Accordingly, since the defect analysis may be performed quickly, there is an advantage that productivity of the semiconductor device may be improved.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A defect detection device comprising:
   a memory configured to store a layout image indicating a circuit pattern and indicating a dummy pattern; and a controller comprising an artificial neural network configured to learn the layout image, the controller being configured to:

delete a defect and convert an element separated by the defect among a plurality of elements into a single element in an inspection image obtained by photographing an area including the defect and the plurality of elements on a wafer when the defect is smaller than a predetermined size in the inspection image, and determine in the inspection image including the converted element whether the defect is in a first area in which the circuit pattern is positioned or in a second area in which the dummy pattern is positioned by using the artificial neural network, and determine a type of the defect based on whether the defect is positioned in the first area or in the second area.

2. The defect detection device of claim 1, wherein the layout image is a graphic data system (GDS) image, and the inspection image is an image taken by a scanning electron microscope (SEM).

3. The defect detection device of claim 1, wherein the controller is further configured to determine that the type of the defect is an intrinsic defect based on the defect being positioned in the first area.

4. The defect detection device of claim 1, wherein the controller is further configured to determine that the type of the defect is a false defect based on the defect being positioned in the second area.

5. The defect detection device of claim 1, further comprising a data preprocessor configured to:

divide a first image of the circuit pattern into a plurality of first cropped images, divide a second image of the dummy pattern into a plurality of second cropped images, and provide the plurality of first cropped images and the plurality of second cropped images to the artificial neural network.

6. The defect detection device of claim 5, wherein a first size of the plurality of first cropped images and a second size of the plurality of second cropped images are the same as a third size of the inspection image.

7. The defect detection device of claim 1, wherein the controller is further configured to:

convert the inspection image into a layout form, input the layout-converted image to the artificial neural network, and determine, using the artificial neural network, whether the defect is in the first area or in the second area.

8. The defect detection device of claim 7, wherein the controller is further configured to convert the inspection image into the layout form based on line width conversion data representing a correspondence relationship between a first line width of a first gate line of a plurality of gate lines in the inspection image in the inspection image and a second line width of a second gate line in the layout image.

9. The defect detection device of claim 7, wherein the controller is further configured to delete the defect in the inspection image to generate the layout-converted image.

10. A defect detection method comprising:

generating a second inspection image by deleting a defect in a first inspection image and converting an element separated by the defect among a plurality of elements into a single element when the defect is smaller than a predetermined size in the first inspection image, wherein the first inspection image is obtained by photographing a wafer including the defect and the plurality of elements, and converting the first inspection image including the converted element into a layout form;

inputting the second inspection image to an artificial neural network which has been trained based on a layout image indicating a circuit pattern and indicating a dummy pattern;

determining, using the artificial neural network, whether the defect is positioned in a first area in which the circuit pattern is positioned or in a second area in which the dummy pattern is positioned; and determining a type of the defect based on whether the defect is positioned in the first area or in the second area.

11. The defect detection method of claim 10, further comprising determining the type of the defect as an intrinsic defect based on the defect being positioned in the first area.

12. The defect detection method of claim 11, further comprising determining the type of the defect as a dangerous defect based on a position of the defect being in the second area and a distance from the position of the defect to the first area being smaller than or equal to a predetermined threshold.

13. The defect detection method of claim 11, further comprising determining the type of the defect as a false defect based on a position of the defect being in the second area and a distance from the position of the defect to the first area being greater than or equal to a predetermined threshold.

14. The defect detection method of claim 10, wherein the converting of the first inspection image into the layout form comprises converting the first inspection image into the layout form based on line width conversion data representing a correspondence relationship between a first line width of a first gate line of a plurality of gate lines in the first inspection image and a second line width of a second gate line in the layout image corresponding to the first gate line.

15. The defect detection method of claim 10, wherein the converting of the first inspection image into the layout form comprises converting the first inspection image into the layout form based on a predetermined rule when designing the circuit pattern and the dummy pattern.

16. A defect detection system comprising:

an inspection device configured to generate an inspection image by photographing a wafer including a defect;

an artificial neural network configured to learn a layout image indicating a circuit pattern and indicating a dummy pattern; and a defect detection device configured to:

delete the defect and convert an element separated by the defect among a plurality of elements into a single element in an inspection image including the defect and the plurality of elements when the defect is smaller than a predetermined size in the inspection image using the artificial neural network, and determine whether the defect is positioned in the inspection image in a first area where the circuit pattern is positioned or in a second area where the dummy pattern is positioned, and determine a type of the defect based on whether the defect is positioned in the first area or in the second area.

17. The defect detection system of claim 16, wherein the defect detection device is further configured to determine that the type of the defect is an intrinsic defect based on the defect being positioned in the first area.

18. The defect detection system of claim 16, wherein the defect detection device is further configured to determine that the type of the defect is a false defect based on the defect being positioned in the second area.

\* \* \* \* \*